United States Patent Office 2,993,060
Patented July 18, 1961

---

2,993,060
ADDUCTS OF BENZOQUINONEDIIMINES
Joseph E. Dunbar, Midland, Mich., assignor to The Dow Chemical Company, Midland, Mich., a corporation of Delaware
No Drawing. Filed Apr. 6, 1959, Ser. No. 804,071
4 Claims. (Cl. 260—396)

This invention is directed to the cyclopentadiene adducts of benzoquinonediimines corresponding to the formula

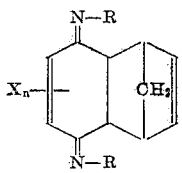

In this and succeeding formulas, each R represents a lower alkylsulfonyl group, X represents halogen having atomic weight not above 80, and $n$ is a positive integer not greater than 2, provided that the aggregate atomic weights of all halogen atoms represented by $X_n$ may not exceed 80. The expression lower alkyl refers to an alkyl radical containing from 1 to 4 carbon atoms, inclusive.

The compounds of this invention are yellow crystalline solids, which are soluble in many organic solvents such as diethyl ether, benzene, and cyclopentane. The compounds are of low solubility in water. The new compounds are exceptionally useful as parasiticides and are adapted to be employed as toxic constituents of compositions for the control of many bacterial, fungal, insect and arachnid pests. They are also valuable as aquatic zootoxins, nemotocides, as active agents in the control of plant parasitic viruses and intestinal parasites of warm blooded animals, and as herbicides.

The condensation products of the present invention may readily be prepared in a Diels-Alder condensation by contacting cyclopentadiene with a benzoquinonediimine compound corresponding to the formula

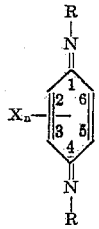

wherein X, $n$, and R have the meanings hereinbefore set forth. The contacting of the cyclopentadiene and benzoquinonediimine compound is preferably effected in an inert solvent as reaction medium. Suitable solvents include chloroform, benzene, toluene and xylene. Under these conditions, reaction temperatures may vary over a wide range, as the reaction takes place smoothly when the reactants are combined at any temperature in the range of from 0° C. to the boiling tempertaure of the reaction mixture or, in a pressure-sealed reaction vessel, to 150° C., with the production of the desired product and no metathetical byproduct. Conveniently the reaction may be carried out at room temperature. Good results are obtained when cyclopentadiene is supplied to the reaction mixture in an amount substantially greater than that equimolecular with the benzoquinonediimine reactant.

In carrying out the reaction, the benzoquinonediimine reactant is dissolved in the reaction solvent, and to the resulting solution freshly distilled cyclopentadiene is added with stirring. Stirring is thereafter continued and the reaction mixture maintained at a reaction temperature for a period of from 5 seconds to 7 days, usually about 10 minutes, to complete the reaction. During the course of the reaction, transient and fugitive color changes usually take place, indicating the progress of the reaction. Typically, the starting benzoquinonediimine solution is of a clear yellow color and the cyclopentadiene is colorless. Soon after the reactants are brought into contact, a hypsochromic color change to violet coloration is observed, which undergoes a bathychromic change, gradually and irregularly, to a very pale yellow. The unvarying pale yellow coloration indicates the conclusion of the reaction, and the presence, in solution, of the desired product. Solvent is thereafter removed by vaporization, and the resulting crude product is available to be employed in accordance with the present utilities. The crude product may be recrystallized from solvent which may be chloroform, carbon tetrachloride, ethyl acetate, cyclohexane, or various mixtures of these and other inert solvents.

The following examples illustrate the present invention but are not to be considered as limiting.

*Example 1.—6-chloro-1,4,4a,8a-tetrahydro-N,N'-bis-(methylsulfonyl)-1,4-methano-5,8-naphthoquinonediimine*

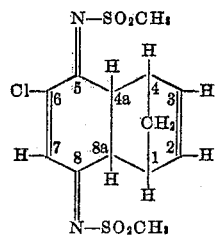

To a solution of 131.5 grams (0.445 mole) 2-chloro-N,N'-bis(methylsulfonyl)-p-benzoquinonediimine in 2.5 liters chloroform was added 72.3 grams (1.11 mole) of freshly-distilled cyclopentadiene in one portion with all combined materials at room temperature. The resulting reaction mixture was stirred during the reaction time of 15 minutes after the combining of the reactants, as the color of the mixture changed to a varying wine-red and then gradually changed to a pale yellow color. Upon completion of the color-change, the resulting solution was warmed over a water bath at subatmospheric pressures to vaporize and remove part of the solvent and reduce the volume of the mixture to less than 500 milliliters but not less than 200 milliliters. The resulting mixture was then diluted with carbon tetrachloride and cooled, whereupon yellow product crystals formed and were removed from the mixture which was then further heated to remove further solvent, further diluted with carbon tetrachloride, and chilled to obtain further product crystals. The total yield was 134.2 grams (83.5 percent) of a 6-chloro-1,4,4a,8a-tetrahydro-N,N'-bis(methylsulfonyl)-1,4-methano-5,8-naphthoquinonediimine product melting with decomposition at 138–140° C., and having contents of carbon, hydrogen, and nitrogen of 43.11, 4.13, and 7.57 weight percent, respectively, as compared with theoretical values of 43.03, 4.17 and 7.72 weight percent respectively.

*Example 2.—6-chloro-N,N'-bis(ethylsulfonyl)-1,4,4a,8a tetrahydro-1,4-methano-5,8-naphthoquinonediimine*

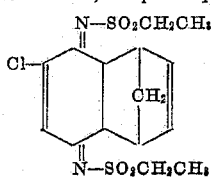

To a solution of 6.5 grams (0.0200 mole) of 2-chloro-N,N'-bis(ethylsulfonyl)-p-benzoquinonediimine in 70 milliliters chloroform was added 10.6 grams (0.160 mole) of freshly-distilled cyclopentadiene in one portion with all combined materials at room temperature. The resulting reaction mixture was stirred during the reaction time of 15 minutes after the combining of the reactants, as the color of the mixture changed to a varying violet to wine-red and then gradually changed to a pale yellow color. Upon completion of the color-change, the resulting solution was warmed at subatmospheric pressures to vaporize and remove part of the solvent and reduce the mixture to a gummy residue. The said residue was then washed with diethyl ether, whereupon 5.81 grams, (74 percent) of yellow product crystals were obtained. The product crystals were removed from the mixture and recrystallized twice from a benzene-ether mixture to obtain pale yellow product crystals of a 6-chloro-N,N'-bis(ethylsulfonyl)-1,4,4a,8a-tetrahydro-1,4 - methano-5,8 - naphthoquinonediimine product melting at 128.5–129.5° C., and having contents of carbon, hydrogen, and nitrogen of 46.11, 4.77, and 7.12 weight percent, respectively, as compared with theoretical values of 46.09, 4.90, and 7.17 weight percent respectively.

*Example 3.—N,N'-bis(n-butylsulfonyl)-6-chloro-1,4,4a, 8a-tetrahydro-1,4-methano-5,8-naphthoquinonediimine*

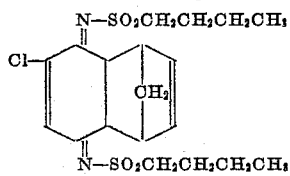

To a solution of 11.0 grams (0.0289 mole) 2-chloro N,N'-bis(n-butylsulfonyl)-p-benzoquinonediimine in 80 milliliters chloroform was added 15.2 grams (0.231 mole) of freshly-distilled cyclopentadiene in one portion with all combined materials at room temperature. The resulting reaction was exothermic and the resulting reaction mixture rose in temperature to an undetermined higher temperature below its boiling temperature as the mixture was stirred during the reaction time of 15 minutes after the combining of the reactants. During the reaction time, the color of the mixture changed to varying hues of amber and violet, and then gradually changed to permanent pale yellow color. Upon completion of the color-change, the resulting solution was warmed at subatmospheric pressures to vaporize and remove part of the solvent and reduce the mixture to a light yellow, highly viscous liquid residue. The said residue was then washed with diethyl ether, resulting in the formation of 11.1 grams of pale yellow product crystals (86 percent). The product crystals were recrystallized twice from a benzene-ether solvent mixture to obtain pale yellow product crystals of a N,N'-bis(n-butylsulfonyl)-6-chloro-1,4,4a,8a - tetrahydro - 1,4 - methano-5,8-naphthoquinonediimine product melting at 112–113° C., and having contents of carbon, hydrogen, and nitrogen of 51.14, 5.99, and 6.21 weight percent, respectively, as compared with theoretical values of 51.05, 6.09 and 6.27 weight percent respectively.

In similar preparation, there is prepared a 6-bromo-1,4,4a,8a - tetrahydro - N,N'-bis(isopropylsulfonyl)-1,4-methano-5,8-naphthoquinonediimine product by the condensation of cyclopentadiene and 2-bromo-6,N'-bis(isopropylsulfonyl)-p-benzoquinonediimine.

In similar manner, there is prepared at 6,7-dichloro-1,4,4a,8a - tetrahydro-N,N'-bis(tertiarybutylsulfonyl)-1,4-methano-5,8-naphthoquinonediimine product by the condensation of cyclopentadiene and 2,3-dichloro-N,N'-bis tertiarybutylsulfonyl)-p-benzoquinonediimine.

In similar preparation, there is prepared a 6-fluoro-1,4,4a,8a - tetrahydro-N,N'-bis(methylsulfonyl)-1,4-methano-5,8-naphthoquinonediimine product by the condensation of cyclopentadiene and 2-fluoro-N,N'-bis(methylsulfonyl)-p-benzoquinonediimine.

Similarly, there is prepared a 6,7-difluoro-1,4,4a,8a - tetrahydro - N,N' - bis(methylsulfonyl)-1,4-methano-5,8-naphthoquinonediimine product by the condensation of cyclopentadiene and 2,3-difluoro-N,N'-bis(methylsulfonyl)-p-benzoquinonediimine.

Similarly, there is prepared a 6-fluoro-7-chloro-1,4,4a,8a - tetrahydro - N,N'-bis(methylsulfonyl)-1,4-methano-5,8-naphthoquinonediimine product by the condensation of cyclopentadiene and 2-fluoro-3-chloro-N,N'-bis(methylsulfonyl)-p-benzoquinonediimine.

The new adducts of the present invention are adapted to be employed for the control of many agricultural and household pests. For such use, these compounds may be dispersed on an inert, finely divided solid and employed as a dust. Also, such prepartaions may be dispersed in water with or without the aid of a wetting agent, and the resulting aqueous suspensions may be employed as a spray or wash. In other procedures, the products may be employed in oils, or as constituents in oil-in-water emulsions or aqueous dispersions. Water dispersible preparations may be added to and dispersed in natural bodies of water to exhibit therein the present utilities. In representative operations the application to the foilage of tomato plants of aqueous spray compositions comprising one half pound of 6-chloro-N,N'-bis(methylsulfonyl)-1,4,4a,8a - tetrahydro - 1,4-methano-5,5-naphthoquinonediimine per 100 gallons of spray mixture gave complete control of spores of *Alternaria solani* (tomato early blight) thereafter applied.

The present compounds are useful also in the control of viruses and nematodes affecting terrestrial plants, as herbicides in the control of submerged or floating aquatic vegetation, and to destroy fish in natural or artificial bodies of water. In a representative operation, the exposure for a period of 2 hours of a population of healthy, strongly growing plants of the common water weed *Cabomba caroliniana* to water in which was dispersed the crude 6-chloro-N,N'-bis(methylsulfonyl)-1,4,4a,8a-tetrahydro-1,4-methano-5,8-naphthoquinonediimine product in the concentration of 100 parts by weight per million parts of ultimate aqueous dispersion, resulted in a 100 percent kill of the said Cabomba.

In contrast, the application as a thorough wetting spray of an aqueous dispersion containing 3.3 pounds per 100 gallons of ultimate composition of the same naphthoquinonediimine to young plants of each of tomato, cranberry bean, field corn, wild oats, and rape, produced no visible injury or other effect upon any of the said terrestrial plants.

The N,N' - bis(alkylsulfonyl)halobenzoquinonediimine starting materials herein employed may be prepared in known methods. In one such method, paraphenylenediamine or a mono- or di-halogen substituted paraphenylenediamine, the individual halogen substituents on which have atomic weights of from 19 to 80 while the sum of the atomic weights of all halogen substituents in a single molecule does not exceed 80, dispersed in pyridine, is contacted with an alkanesulfonylchloride to obtain a paraphenylene - N,N' - bis(alkanesulfonamide) or ring-substituted paraphenylene-N,N'-bis(alkanesulfonamide). This phenylenesulfonamide compound is then contacted with lead tetraacetate in glacial acetic acid whereby the phenylene moiety is oxidized to the corresponding quinonediimine. In an alternative manner of preparing the halogen substituted starting materials employed according to the present invention, the unsubstituted quinonediimine compound may be treated in known manner with anhydrous halogen halide or with a strong hydrohalic acid to prepare the hydrohalide adduct in the form of a ring-substituted paraphenylene - N,N' - bis(alkanesulfonamide) which may thereafter be oxidized with the em-

I claim:
1. A cyclopentadiene adduct of a benzoquinonediimine corresponding to the formula

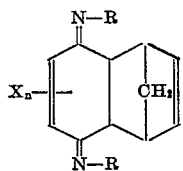

wherein each R represents a lower alkylsulfonyl group, X represents halogen having an atomic weight not greater than 80, $n$ is a positive integer not greater than 2, and the aggregate atomic weights of all halogen atoms represented by $X_n$ does not exceed 80, and the term lower alkyl refers to an alkyl radical containing from 1 to 4 carbon atoms inclusive.

2. 6 - chloro - 1,4,4a,8a - tetrahydro - N,N' - bis-(methylsulfonyl) - 1,4 - methano - 5,8 - naphthoquinonediimine.

3. 6 - chloro - N,N' - bis(ethylsulfonyl) - 1,4,4a,8a-tetrahydro-1,4-methano-5,8-naphthoquinonediimine.

4. N,N'-bis(n-butylsulfonyl)-6-chloro-1,4,4a,8a-tetrahydro-1,4-methano-5,8-naphthoquinonediimine.

References Cited in the file of this patent

Adams et al.: J. Am. Chem. Soc., vol. 73, pp. 1152–1155 (1951).
Adams et al.: Bull. Soc. Chim. France, vol. 1958, pp. 23–65 (1958).